United States Patent [19]
Otsuka
[11] 3,755,679
[45] Aug. 28, 1973

[54] CONSTANT PHOTON ENERGY SOURCE

[75] Inventor: William M. Otsuka, Sunnyvale, Calif.
[73] Assignee: Monsanto Company, Saint Louis, Mo.

[22] Filed: July 10, 1972
[21] Appl. No.: 270,114

Related U.S. Application Data
[63] Continuation of Ser. No. 75,003, Sept. 24, 1970, abandoned.

[52] U.S. Cl. ........... 250/217 SS, 250/205, 307/310, 307/311, 313/108 D, 315/158
[51] Int. Cl. ........... H01j 39/12
[58] Field of Search ........... 250/205, 217 SS, 250/211 J; 307/310, 311; 313/108 D; 315/149, 156, 158; 317/235 N

[56] References Cited
UNITED STATES PATENTS

| | | | |
|---|---|---|---|
| 3,421,009 | 1/1969 | Caruthers | 315/158 |
| 3,366,834 | 1/1968 | Potter | 315/158 |
| 3,473,084 | 10/1969 | Dodge | 315/149 |
| 3,705,316 | 12/1972 | Burrous | 307/311 |

*Primary Examiner*—James W. Lawrence
*Assistant Examiner*—D. C. Nelms
*Attorney*—William I. Andress et al.

[57] ABSTRACT

The disclosure herein relates to a solid-satte semiconductor constant photon energy source and circuits therefor, including a temperature-compensating circuit and a light-sensing control element circuit.

7 Claims, 2 Drawing Figures

INVENTOR
WILLIAM M. OTSUKA

BY William I. Andress
ATTORNEY

CONSTANT PHOTON ENERGY SOURCE

This is a continuation of application Ser. No. 75,003, filed Sept. 24, 1970, now abandoned.

BACKGROUND OF THE INVENTION

This invention pertains to the field of light sources and, in particular, temperature-compensated constant photon energy sources and circuits therefor.

In conventional light sources, e.g., thermal sources such as tungsten filament lamps, gaseous sources such as neon lamps, luminescent sources such as fluorescent lamps or combinations thereof, constant photon emission cannot be effectively achieved reliably due to rapid aging of the lamp, blackening of encapsulating enclosures or changes of temperature.

In view of the disadvantages of conventional light sources, workers in this field have given attention to developing solid-state semiconductor light sources and circuits therefor. Light-emitting diodes have come into widespread use as light sources in a variety of industrial equipment and for application in film annotation, character recognition, visual displays, optical encoders, card and tape readers, calibration of high-speed detectors, in emitter-detector optoisolators, etc. However, due to the negative temperature coefficient of the same diode, light emission therefrom is adversely affected by changes in ambient temperatures resulting in unstable, unreliable and, where critical, unacceptable performance. So far as known, no simple method has heretofore been proposed for providing a constant photon energy source and for achieving and maintaining a constant photon energy emission. As used herein, photon energy refers to electromagnetic energy whether in the visible or invisible portion of the electromagnetic spectrum.

SUMMARY OF THE INVENTION

The present invention relates to a novel semiconductor light source which is stable, long lasting and insensitive to temperature changes.

The constant photon energy source of this invention comprises a circuit driven from a regulated D.C. supply, a base drive transistor, a plurality of resistors and a thermistor or, alternatively, a photodiode. The transistor and resistors set the forward current of the light-emitting diode at ambient temperatures and the thermistor provides the necessary temperature compensation. The light-emitting diode temperature coefficient is negative and the diode's light output decreases with increases in temperature. Increases in temperature decrease the thermistor's resistance thus increasing the base drive of the transistor and, consequently, the diode current. For falling temperatures, the forward current is lowered by an increase in the resistance of the thermistor. In this manner, the current through the diode is reduced as the temperature decreases and the photon output of the diode remains stable.

As a result of this circuit, the photon output of the light-emitting diode remains constant within about ±2 percent over a temperature range of +10° C to +50° C.

It is, therefore, a primary object of this invention to provide a simple and uncomplicated solid-state semiconductor light source having temperature compensating characteristics for constant and reliable photon emission performance.

It is a further object of this invention to provide modifications of a constant photon energy source utilizing a photodiode in an optical feedback circuit or, alternatively, a non-optical feedback circuit including a thermistor in lieu of a photodiode.

Still another object of the invention is the provision of a long-life constant photon energy source which can be used in critical applications involving ambient temperature changes without deterioration or blackening of the encapsulant for the light-emitting source.

DESCRIPTION OF THE PREFERRED EMBODIMENTS

EXAMPLE 1

The embodiment of the invention described in this example has reference to the use of a temperature-compensating thermistor in a constant photon energy circuit.

Figure 1:
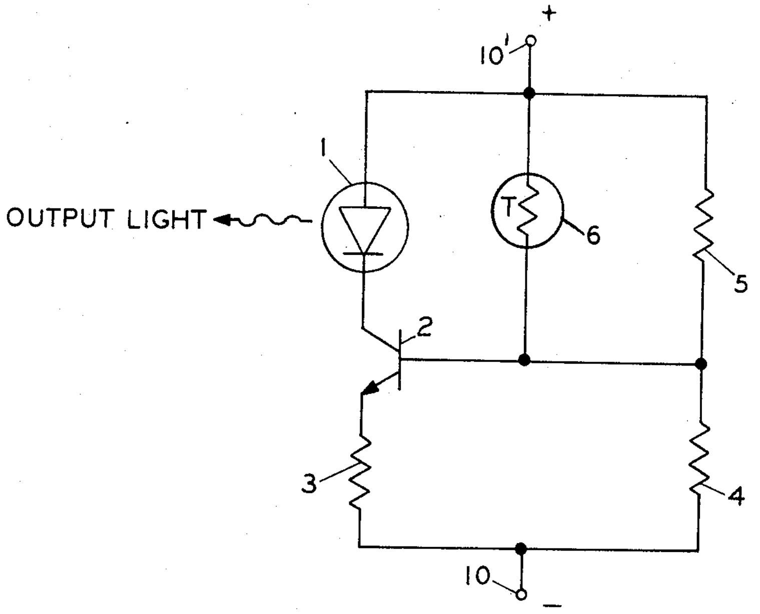
In FIG. 1 is shown a schematic circuit diagram illustrating one embodiment of the constant photon energy source according to this invention.

Referring to FIG. 1, the circuit is driven from a conventional regulated D.C. power supply which is connected to the terminals 10 and 10' and provides a +12 volt potential across the circuit. The forward current of a gallium arsenide phosphide red diode 1 is set by the transistor 2 and resistors 3, 4 and 5 at ambient temperature. Due to the negative temperature coefficient of the light-emitting diode, increases in temperature cause the diode's light output to decrease. However, increases in temperature also decrease the thermistor's 6 resistance, thus increasing the base drive of the transistor and, consequently, the forward current of the light-emitting diode. For falling temperatures, the forward current is lowered by the increase in the thermistor's resistance. As a result, the light output of the light-emitting diode, which is directly porportional to the forward current, remains constant over the temperature range, e.g., of from +10° C to +50° C.

EXAMPLE 2

In the embodiment of this example a constant photon energy source using optical feedback is described wherein a photodiode is used in the circuit in lieu of a thermistor.

Figure 2:
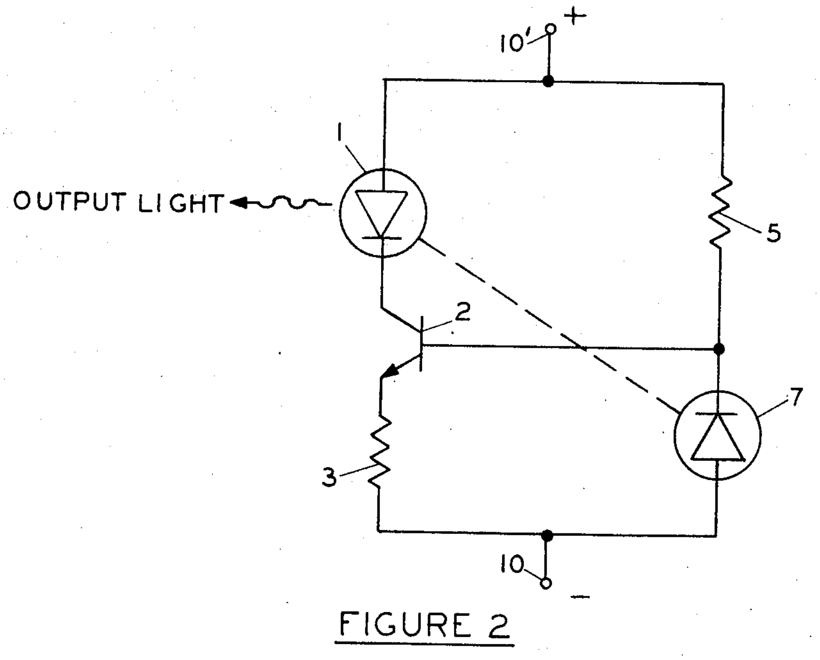
In FIG. 2 is shown a schematic circuit diagram illustrating another embodiment of the invention wherein a photodiode is used in the circuit in lieu of a thermistor.

Referring to FIG. 2, a silicon PIN photodiode 7 is employed to sense the light output of light-emitting diode 1. As the temperature increases, the light output of the light-emitting diode decreases, causing less current to be generated in the photodiode 7 resulting in greater base drive of the transistor 2 and, therefore, increased forward current of the light-emitting diode. The light output of the light-emitting diode again remains constant over the temperature range, e.g., +10° C to +50° C.

By way of further illustration, a constant photon energy source of the type described in FIG. 1 was operated successfully with a +12 volt power supply when the circuit components had the following approximate values:

Resistor 3: 200 ohms
Resistor 4: 5.1 K ohms
Resistor 5: 10 K ohms

Transistor: Motorola MPS-6575
Thermistor: Fenwall JA41J1
Light Emitting Diode: Monsanto MV10B (red); forward current 25 mA The circuit of FIG. 2 may be further operated as described above when the components thereof have the following approximate values when operated with a +12 volt power supply:

Resistor 3: 200 ohms
Resistor 5: 10 K ohms
Transistor 2: Motorola MPS-6575
Photodiode 7: Monsanto MD1 or MD2, Silicon PIN
Light Emitting Diode 1: Monsanto MV10B or MI20C (infrared);
forward current 25 mA With further respect to the transistor element 2 shown in FIGS. 1 & 2, other three-terminal active devices may suitably be used; such as, PNP transistor, FET's, tubes, etc.

Other photo sensing devices than the photodiodes exemplified above which may suitably be used herein include PN, NPN or PNP structures in silicon, germanium, III-V compounds, e.g., gallium arsenide, and II-VI compounds, e.g. cadmium sulfide and cadmium selenide. Also, useful in the system disclosed herein are non-solid state photo sensors, such as vacuum, gas filled, and multiplier phototubes. It will be understood to those skilled in the art that in line with the purpose of the circuit used herein that the photo sensing element should exhibit or be controlled to exhibit an essentially linear responsivity.

Semiconductor materials suitable for use in the light-emitting diode element herein include compounds selected from the group consisting of III-V compounds and mixed crystals thereof and II-VI compounds and mixed crystals thereof. Where a red light source is desired gallium arsenide phosphide having the formula $GaAs_xP_{1-x}$, where $x$ has a numerical value greater than zero and less than one, may be used. Various shades of green, yellow and amber light are provided by use of gallium phosphide and blue light emission is provided by zinc sulfide. And where an infra-red source is desired, gallium arsenide may be used.

Particularly suitable light-emitting diodes are Monsanto's families of gallium arsenide, gallium phosphide and gallium arsenide phosphide diodes. These diodes offer the electro-optical designer a variety of colors to choose from for his circuits. For example, red light is provided by Monsanto's gallium arsenide phosphide diodes MV10A, MV10B, MV10A3, MV50 and MV10B3; amber or green is provided by gallium phosphide diodes Mv1 and MV2 and, when desired, infrared light may be provided by diodes ME1, ME2, ME2A, ME3, ME4, ME5, ME5A, ME6, ME7, ME60, and MI20C.

The constant photon energy source according to this invention may be used as a constant photon flux reference standard and, in addition to this and the uses mentioned earlier, as a regulating element for electro-optical circuits, in spectrometry and spectrochemical analyzers.

As indicated above, the constant photon energy source and circuit herein has particular application and broad utility in ambient temperature environments within a range of +10° C to +50° C with light output variations within about ±2 percent. However, this circuit can be operated over a much greater temperature range with a slightly higher percent change in light output in applications which do not require stringent temperature stability. On the other hand, where enhanced performance or a more critically controlled constant light output; e.g., less than about one percent change in light output is required, or desired, this may be achieved by a very careful selection and matching of all circuit components.

It will be appreciated that various modifications of the foregoing embodiments will occur to those skilled in the art without departing from the spirit and scope thereof.

I claim:

1. A constant photon energy source and circuit therefor comprising a light-emitting diode and a three-terminal active element device serially connected across a pair of power supply terminals and forming a conductive path for diode forward current, said active element device including a control electrode for receiving input control current for controlling the forward current through said diode, and temperature sensing means connected between said control electrode and one of said power supply terminals for providing said control current to said control electrode of said active element device in response to temperature changes within said circuit, whereby said temperature sensing means produces variations in current flowing in said series path to compensate for and offset temperature induced current variations in said diode, and thereby maintain a substantially constant forward current through and light output from said diode.

2. Source and circuit according to claim 1 wherein said temperature sensing means is a thermistor.

3. A circuit for generating a constant light output including, in combination: a light-emitting diode and a three-terminal active element device serially connected across a pair of power supply terminals and operative to conduct forward current through said diode when said terminals are connected to a power supply, said active element device having a control electrode for receiving a control current sufficient to maintain a substantially constant current through said active element device and through said light-emitting diode, and a control device connected between said control electrode of said active element device and one of said power supply terminals and operative to vary said control current as a function of the variations in temperature within said circuit, whereby said control current generates an offsetting current in the series path of said active element device and said diode for compensating for temperature induced current variations in said light-emitting diode as a result of the temperature coefficient of resistance of said diode, thereby maintaining a substantially constant light output from said light-emitting diode at all times.

4. The circuit defined in claim 3 wherein said three-terminal active element device is a transistor having emitter, base, and collector electrodes, with said emitter and collector electrodes serially connected to said diode between said power supply terminals, and said control electrode connected to said control device.

5. The circuit defined in claim 3 wherein said control device is a thermistor connected between said base electrode of said transistor and the same power supply terminal to which said light-emitting diode is connected, said thermistor generating said control current at the base electrode of said transistor.

6. The circuit defined in claim 4 wherein said control device is a photodetector connected between said control electrode and one of said power supply terminals, said photodetector optically coupled to said light-emitting diode in an optical feedback arrangement, whereby temperature induced changes in the light output of said light-emitting diode are fed back to control the bias on said photodetector, and said photodetector in turn controls the level of said control current flowing to the control electrode of said active element device.

7. The circuit defined in claim 6 wherein said photodetector is a photodiode and wherein a current limiting resistor is connected in series with said photodiode and between said photodiode and one of said power supply terminals; the total current flowing through said current limiting resistor being divided between said photodiode and said active element device by an amount determined by the internal resistance of said photodiode, and said internal resistance of said photodiode being controlled by the light impinging thereon and received from said light-emitting diode, whereby said light-emitting diode provides self-stabilzation for the substantially constant forward current flowing therethrough.

* * * * *